United States Patent Office 3,519,476
Patented July 7, 1970

3,519,476
PROCESS FOR IMPREGNATING WOOD AND PRODUCTS THEREOF
Bart J. Bremmer and Lawrence F. Sonnabend, Midland, Mich., assignors to The Dow Chemical Company, Midland, Mich., a corporation of Delaware
No Drawing. Filed Nov. 22, 1967, Ser. No. 684,955
Int. Cl. C09d 5/18; B27k 3/50
U.S. Cl. 117—136             10 Claims

ABSTRACT OF THE DISCLOSURE

A process for impregnating wood with a dimensionally stabilizing and fire-retardant resin which comprises: (1) reacting a mixture of a phenol and $NH_3$ urea or an amine with an aldehyde, and then adding an acid to that reaction mixture; (2) impregnating the wood with the above product; and (3) contacting the impregnated wood with heat alone, or heat and an excess of $NH_3$ or an amine to cure the resin.

BACKGROUND OF THE INVENTION

In normal practice, the fire-retardant qualities of wood are improved by the addition of a salt to the wood. This process, however, results in a composition from which the fire-retardant chemical is easily removed under high humidity or wet conditions.

This invention is an improvement of, and differs from, the prior art in that the fire-retardant additives are formed in, and/or impregnated into, the wood. Thus, they are not readily extracted. Moreover, the impregnation of the wood with the resin, and its subsequent curing, results in dimensional stability.

SUMMARY OF THE INVENTION

This invention is a novel process for dimensionally stabilizing and improving the fire-retardancy of wood, which comprises impregnating said wood with a phenol/aldehyde/amine resin-acid composition, which is water soluble, and then cross-linking the resin with heat alone, or heat and $NH_3$ or an amine, at elevated temperatures. The resulting cured resin is not water soluble and the qualities imparted to the wood by it, i.e. dimensional stability and improved fire-retardancy, are not, therefore, dimensioned by leaching during periods of wetness or high humidity.

More particularly, the instant invention is a process which comprises reacting by contacting, at a temperature of about 25° to 80° C., and preferably about 45° to 55° C., a mixture of about 1 mole of a phenol having at least two reactive hydrogen sites in the ortho and/or para positions of the benzene ring, and about 0.2 to 1.0 mole, preferably about 0.3 to 0.6 mole, of either $NH_3$ urea or an aliphatic or cycloaliphatic amine having at least two active hydrogen sites on the amine nitrogen or nitrogens, with about 1 to 5 moles, preferably about 1.2 to 2 moles, of an aliphatic or cycloaliphatic aldehyde. After the above reactants have had ample time to react, suitably about one-half to one and one-half hours, an acid which contains one or more of the elements B, P, Cl, As, Br, Sb and I, such as $H_3PO_4$, HCl, $H_3BO_3$, HBr, $H_3SbO_4$, HI, trichloroacetic acid, diiodoacetic acid, and arsenoacetic acid, or mixtures of said acids is added to produce the fire-retardant qualities desired. Concentrations of said acids or mixtures thereof is not critical.

The phenols which are suitable for the process of this invention can be substituted with inert substituents in any available ring position, suitable substituents being, for example, halogenated phenols, such as 3-chlorophenol, 4-bromophenol, 2,5-dichlorophenol and 3,5-dibromophenol; alkyl phenols of from 1 to 8 carbon atoms in each alkyl group, such as 3-propylphenol, 5-methylphenol, 3,5-dimethylphenol, 3-methyl-5-octylphenol and 3,5-diethyl-4-methylphenol.

The aldehydes which are suitable for the process of this invention are aliphatic and cycloaliphatic aldehydes of from 1 to 5 carbon atoms, such as formaldehyde, acetaldehyde, propionaldehyde, butyraldehyde and furfuraldehyde.

The amount of acid, or mixtures thereof, used for this process is generally any amount which represents a desired level of protection from fire or prolonged heat. Suitably, about 0.1 to 2.0 moles per mole of phenol and more may be employed, with the exception of $H_3BO_3$, for which an upper limit of 0.25 mole per mole of phenol is desirable, as an amount in excess of this will crystallize out of solution.

The product prepared according to the above is water soluble, and is impregnated into wood through any standard method, such as soaking, pressure or vacuum techniques.

The material to be treated with the process of this invention can suitably be planks, boards, shingles or any other split, sawed or planed wood or lumber product, or any material made from the molding or forming, by any technique, of ground, shredded, splintered or otherwise cut-up pieces of wood.

The amount of the above product which is absorbed by wood, i.e., percent pickup weight, is defined as the weight of product absorbed by the sample (calculated by subtracting the sample's dry weight from the sample's weight after impregnation), divided by the weight of the sample before impregnation, times 100. The product of this process lends itself to a wide range of effective percent pickup weights. Generally, the pickup will vary according to the following factors: quality desired, i.e., dimensional stability or fire-retardancy; degree of that quality sought; type of acid and amount used; and material to be treated. Evaluation by standard tests, well known in the art, for dimensional stability and fire retardancy will teach the optimum amount to be used in a given case. Generally, about 10% to about 120%, or more, is suitable for most materials.

After the material has absorbed the desired percent pickup weight, it is then cured. Curing can be accomplished in three ways: (1) heat the impregnated material to about 85° to 150° C., or (2) treat the impregnated material with $NH_3$ or a liquid or gaseous aliphatic or cycloaliphatic primary or secondary amine (a) while heating to 85° to 150° C., or (b) heat the impregnated material to 85°–150° C. after said treatment. Primary and secondary amines which are suitable for the process of this invention are those which contain 1 to 16 total carbon atoms, for example, monomethylamine, t-butylamine, tri-n-butylamine and ethylenediamine, dioctyldiamine, piperidine, cyclohexylamine, and dibutylamine.

Suitably an excess, based on the equivalents of acid originally employed, of the curing agent is employed, and, for practical purposes, no less than about one equivalent of said agent per equivalent of acid originally employed should be used. Although atmospheric or autogenous pressure is suitable, pressures of 50 to 200 p.s.i.g. are desirable to shorten the curing process and insure greater contact of resin and curing agent.

The resin-like product of the first part of this process is not normally suitable as a "glue" for making pressboard, wallboard and other wood materials which are molded or formed from pieces of wood. However, it does offer dimensional stability and fire-retardancy for these types of products when incorporated into the materials in, for example, these two ways:

(1) Impregnate and crosslink the finished product in the same way boards, shingles, etc, would be treated;

(2) Impregnate and crosslink each individual piece of wood before they are "glued" together into the finished product.

SPECIFIC EMBODIMENTS

A number of samples were made using the process of this invention, each sample varying from the others only in the kind and amount of acid used.

In all cases, 3 moles (282 grams) of phenol and an amine (compound and amount specified in following chart) were placed in a suitable vessel and heated to 50° C. Then, 4 moles (325 grams) of 37% formaldehyde were added over a 30-minute period while keeping the temperature at 50° C. The reaction mixture was kept at this temperature for an additional one and one-half hours and then cooled to 25° C.

At this point various kinds and amounts of acids were added, under stirring, as follows:

TABLE I

| Run number | Amine used | | $H_3PO_4$ | | HBr | | $H_3BO_3$ | |
|---|---|---|---|---|---|---|---|---|
| | Grams | Moles | Grams | Moles | Grams | Moles | Grams | Moles |
| Monoethanolamine: | | | | | | | | |
| 1 | 61 | 1.00 | 112.5 | 1.15 | | | | |
| 2 | 61 | 1.00 | | | 127 | 1.57 | | |
| 3 | 61 | 1.00 | 90 | 0.92 | | | 42.8 | 0.69 |
| 4 | 61 | 1.00 | 70 | 0.72 | | | 40.0 | 0.64 |
| 5 | 122 | 2.00 | 220 | 2.04 | 40 | 0.49 | | |
| Ethylenediamine: | | | | | | | | |
| 6 | 120 | 2.00 | 371 | 3.79 | 40 | 0.49 | | |

The products which resulted were clear and water soluble.

For the treatment of wood with the above products, the following general procedure was followed:

Pieces of Ponderosa pine with dimensions ½ inch x ½ inch x 3 inches were impregnated with various samples, and mixtures thereof, of the products as defined in Table I by placing the pieces of wood in a one-liter Parr bomb and drawing a vacuum on the bomb. The product was then added under vacuum, the vacuum released and the wood soaked in it for 30 minutes. The excess was then drained and ammonia gas put in the bomb until a pressure of 10 p.s.i.g. was obtained. The contents of the bomb were then heated to 100° C. and a pressure of 70 p.s.i.g. applied using nitrogen gas. The wood pieces were kept at 100° C. overnight, removed from the bomb and dried at 90° to 95° C. until the weight of the pieces remained constant.

Pieces of pine treated with each of the products of Table I were then held in the flame of a Bunsen burner. They did not burn after the flame was removed, nor was there any significant afterglow.

Samples of wood-fiber pressboard were similarly, impregnated with each of the products of Table I, the percent pickup weight varying from 6.8% to 63% by varying the soak time. This material when held in the flame of a Bunsen burner did not burn after the flame was removed when the impregnation was above 9.4% pickup weight. Below this percent, the material did not burn as severely as a non-treated sample, however. The afterglow was also considerably less.

The fire retardant qualities of treated Ponderosa pine were further tested by the so-called "crib" test, ASTM designation E-160-50. Table II, following, summarizes these data. The first column, i.e. Run No., gives the impregnation solution tested, the numbers corresponding to Table I. The run numbered "1+2" is a 50%–50% mixture of these two individual products, as is the run numbered "2+4" a 50%–50% mixture of those two.

The column labeled "Flame Out" indicates, in terms of minutes and seconds, when the flame went out in the samples in relation to when the burner was applied. Please note that the ASTM requires the burner to be applied to the wood for only 3 minutes.

Finally, the last column indicates the average percent pickup weight of the samples, said term being previously defined.

TABLE II

| | Flame out | Percent wt. lost | After-glow | Avg. percent p.u. wt |
|---|---|---|---|---|
| Run No.: | | | | |
| 5 | 7'25" | 36.9 | No | 30.5 |
| 6 | 8'20" | 39.2 | No | 25.6 |
| 4 | 6'11" | 62.6 | No | 44.8 |
| 1+2 | 7'35" | 55.6 | No | 48.0 |
| 2+4 | 6'42" | 61.8 | Some | 43.2 |
| 2 | 9'10" | 89.7 | do | 45.0 |

We claim:
1. A process for impregnating wood with a fire-retardent resin, which comprises:
   (A) Reacting by contacting a mixture of
      1 mole of a phenol having at least two reactive hydrogen sites in the ortho and para positions of the benzene ring, and
      0.2 to 1.0 mole of $NH_3$, urea or an aliphatic or cycloaliphatic amine having at least two reactive hydrogen sites on the amine nitrogen or nitrogens, with
      1 to 5 moles of an aliphatic or cycloaliphatic aldehyde containing not more than 5 carbon atoms, and then adding
      an amount of an acid containing one or more of the elements B, P, Cl, As, Br, Sb and I, or mixtures of said acids, sufficient to produce the desired fire-retardant effect;
   (B) Impregnating the wood with the product of (A) above with a percent pickup weight sufficient to impart the desired fire-retardancy; and
   (C) Curing the impregnated wood.
2. The product produced by the process of claim 1.
3. The process of claim 1 wherein the mole ratio of phenol/amine is 1.0/0.3 to 1.0/0.6.
4. The process of claim 1 wherein the phenol used is phenol.
5. The process of claim 1 wherein the amine used in step (A) is ethanolamine or ethylenediamine.
6. The process of claim 1 wherein the acid used is $H_3PO_4$, HBr, $H_3BO_3$ or a mixture thereof.
7. The process of claim 1 wherein the amount of acid, or mixture of acids, used is 0.1 to 2.0 moles per mole of phenol.
8. The process of claim 1 wherein the percent weight pickup is 10% to 120%.
9. The process of claim 1 wherein the curing agent used in step (C) is $NH_3$.

10. The process of claim 1 wherein the molar ratio of aldehyde to phenol is 1.2 to 2.0.

References Cited

UNITED STATES PATENTS

| | | | |
|---|---|---|---|
| 2,089,697 | 8/1937 | Groebe | 106—15 X |
| 2,632,743 | 3/1953 | Eckert | 106—15 X |
| 2,661,341 | 12/1953 | Nason et al. | 117—137 X |
| 2,824,849 | 2/1958 | Boiney | 117—136 X |
| 2,917,408 | 12/1959 | Golstein et al. | 106—15 X |
| 2,983,629 | 5/1961 | Anderson | 117—148 |
| 3,159,503 | 12/1964 | Golstein et al. | 117—137 |
| 3,160,515 | 12/1964 | Golstein et al. | 117—137 X |
| 3,317,472 | 5/1967 | Fitko et al. | 117—161 X |
| 3,320,213 | 5/1967 | Smith | 117—148 X |
| 3,383,267 | 5/1968 | Sunden | 117—137 X |
| 3,421,923 | 1/1969 | Guth | 117—62.2 |

WILLIAM D. MARTIN, Primary Examiner

H. J. GWINNELL, Assistant Examiner

U.S. Cl. X.R.

117—148, 62.2